United States Patent [19]

Wallman

[11] Patent Number: 5,022,811

[45] Date of Patent: Jun. 11, 1991

[54] ASSEMBLY FOR MOVING HEAVY OBJECTS

[76] Inventor: Lennart K. O. Wallman, Harstenagatan 2, S-582 73 Linkoping, Sweden

[21] Appl. No.: 457,706

[22] PCT Filed: Jun. 29, 1988

[86] PCT No.: PCT/SE88/00359

§ 371 Date: Feb. 12, 1990

§ 102(e) Date: Feb. 12, 1990

[87] PCT Pub. No.: WO89/00146

PCT Pub. Date: Jan. 12, 1989

[30] Foreign Application Priority Data

Jul. 6, 1987 [SE] Sweden ................................ 8702768

[51] Int. Cl.[5] ............................ B66F 9/12; B23Q 7/00

[52] U.S. Cl. ...................................... 414/607; 414/661

[58] Field of Search ................................ 414/659–661, 414/280, 607, 751

[56] References Cited

U.S. PATENT DOCUMENTS

| | | | |
|---|---|---|---|
| 2,699,878 | 1/1955 | Avery | 414/661 X |
| 2,756,885 | 7/1956 | Ackermann | 414/661 |
| 2,818,189 | 12/1957 | Schreck | 414/661 |
| 3,066,785 | 12/1962 | Rosendahl | 414/751 X |
| 3,202,303 | 8/1965 | Chasar | 414/661 X |
| 3,337,070 | 8/1967 | Guilbert, Jr. | 414/661 |
| 3,630,319 | 12/1971 | Peterson et al. | 414/661 X |
| 3,809,259 | 5/1974 | Pipes | 414/280 |
| 4,615,429 | 10/1986 | Arase | 414/280 X |
| 4,690,611 | 9/1987 | Nobuhara | 414/661 |

FOREIGN PATENT DOCUMENTS

| | | |
|---|---|---|
| 436275 | 11/1984 | Sweden . |
| 950884 | 2/1964 | United Kingdom . |

*Primary Examiner*—David A. Bucci

[57] ABSTRACT

An assembly for movement of heavy objects is made up of a unit which can be arranged on the fork of a forklift truck and which has a sliding plane (5) and an operating mechanism (8) designed so as to be able to pull or push an object onto or respectively out from the sliding plane and along the latter. The operating mechanism has, in parallel tracks below the sliding plane, longitudinally displaceable drive elements (9, 10) and, arranged on these, carriers (13) which project above the sliding plane and transmit force to the object.

5 Claims, 2 Drawing Sheets

Fig. 1.
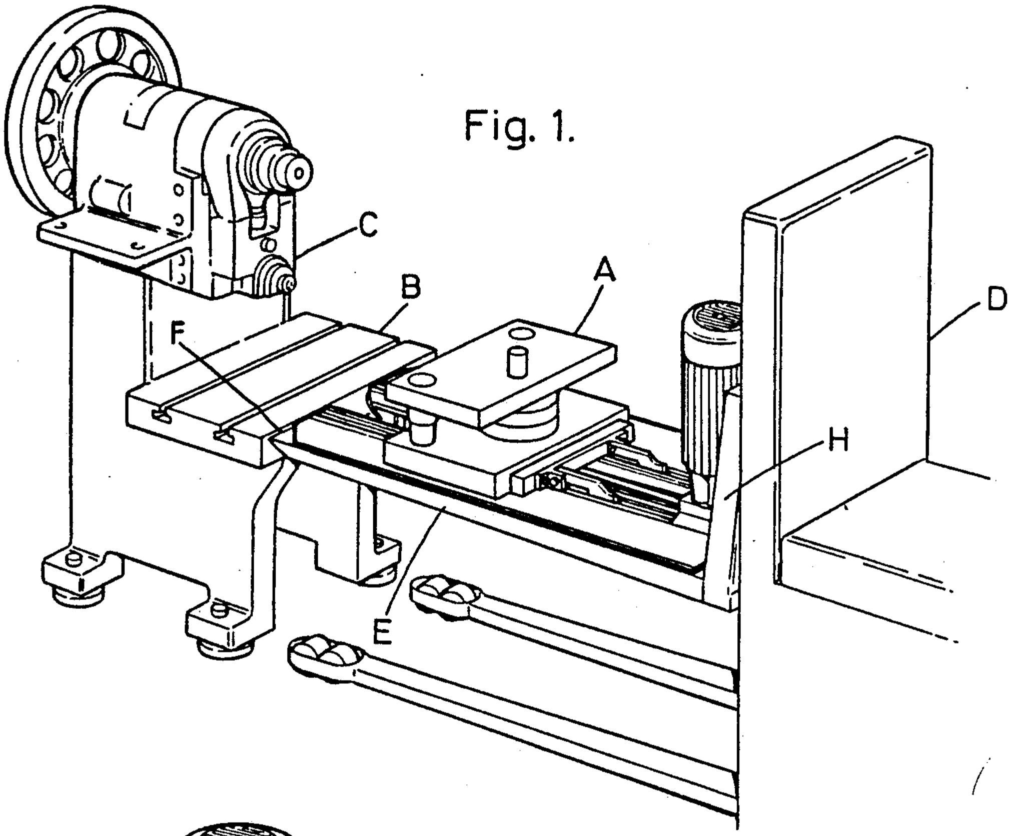
Fig. 5.
Fig. 2.
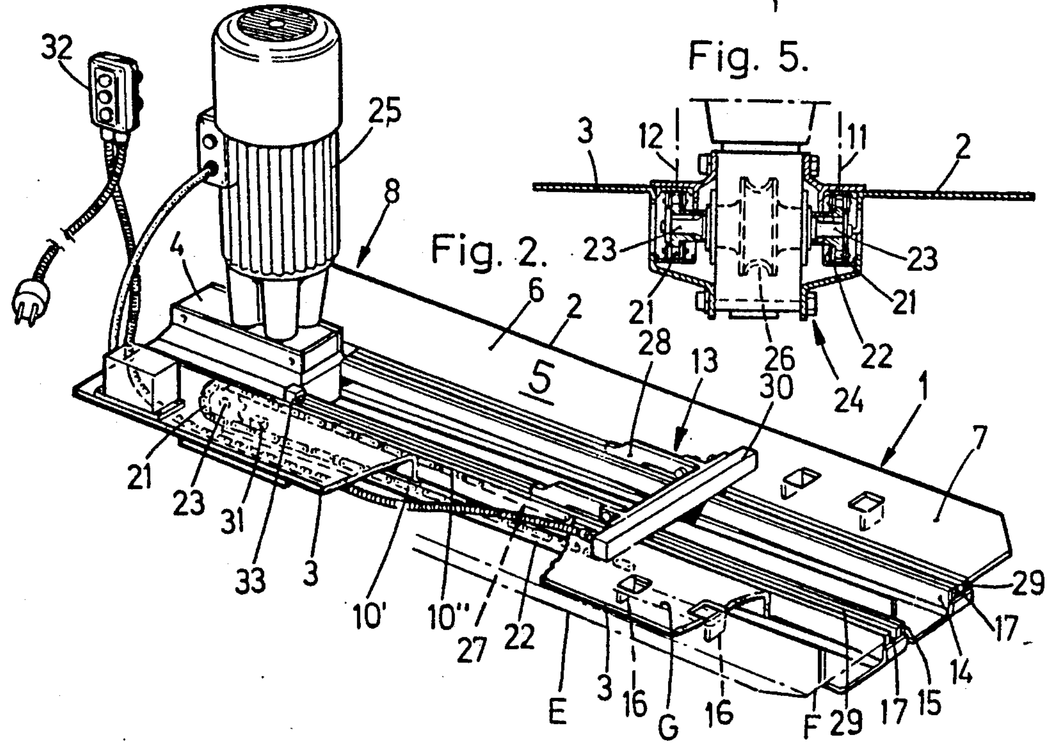

ASSEMBLY FOR MOVING HEAVY OBJECTS

FIELD OF THE INVENTION

The present invention relates to an assembly that is useful in industrial premises for conveying heavy objects such as press tools, workpieces and the like, for facilitating the movement of the objects from one to another of a number of supports such as a loading stool, a shelf or a table in a press or other machine tool.

The invention relates more particularly to the known type of such assemblies that comprises a unit which is arranged to be placed on the fork or a forklift truck and which, when placed on the fork, forms a sliding surface that extends in the longitudinal direction of the fork tines, for carrying the objects, and which unit comprises an operating mechanism designed to be able to pull onto the sliding surface an object situated on a first supporting surface that is level with the sliding surface, to slide the object along the sliding surface towards its inner end to a conveying position and, in the opposite direction, to push the object from the conveying position, sliding along the surface and past its outer end onto a second supporting surface which also, upon adjustment in height of the fork, is level with the sliding surface.

BACKGROUND OF THE INVENTION

In a commercially available assembly of this type the operating mechanism consists of two parallel, electrically driven ball screws which have their ball nuts connected to a toggle on the top side of the sliding surface. The toggle consists of a couple of links which can operate in two different relative positions, of which one, when the links are pulled together and stand at an angle to the sliding surface, can be used when, for example, a press tool is moved while it is resting on the sliding surface, while the second relative position, when the toggle is adjusted so that the links are in line with each other and with the sliding surface and thus can reach outside the sliding surface, is the one which has to be used for the tool to be transferred from the sliding surface to a press table or other support, just as when transferring in the opposite direction onto the sliding surface.

With each such transfer of large and heavy objects from or to a support the toggle has to be adjusted between these two working positions, and this adjustment requires that the ball screws operate while the object is lying still on the sliding surface. This discontinuous working manner delays and complicates the handling of the objects. Also, because of the design of the operating mechanism, the assembly is unnecessarily expensive.

It is also previously known to incorporate, in a forklift truck, a hydraulic-mechanical operating mechanism for handling press tools and the like. The forklift truck is made specially for the purpose and so cannot be used generally as a goods and transport vehicle. It therefore remains unused throughout the period which elapses in a plant between tool changes and similar operations that can be carried out with the truck. In addition to the fact that it is uneconomical, this forklift truck has the disadvantage that its operating mechanism operates hydraulically, i.e. it does not permit handling of heavy objects, such as are found in the engineering industry, of 1 meter or more.

SUMMARY OF THE INVENTION

The aim of the invention is to make use of the great transport economy advantages which lie in an accessory for use in moving objects in an industrial plant by means of a forklift truck, constituting a unit which can be placed on the forklift truck at the times when such movement is to be carried out, but which, in the interim, can be kept separate from the forklift truck so that the truck can be used for other conveying work arising in the industrial plant. The invention seeks to incorporate this advantage into an assembly suitable for this purpose which, as an accessory to a forklift truck, is made up of simple mechanical components, is easy and inexpensive to manufacture, and is simple to operate.

At the same time the invention seeks to eliminate the disadvantages which are found in the above mentioned prior assemblies of this type wherein a continuous displacement movement is not possible.

These aims are achieved, according to the primary characterizing features of the invention, by an operating mechanism comprising a pair of chains each of which is arranged to be displaced in the longitudinal direction of the fork tines and parallel to the other chain by means of a sprocket wheel located at the rear end of the sliding surface and which forms one operative and one inoperative chain stretch, each having a free end, the operative chain stretch being lengthwise slidably confined in a straight groove extending from the upper part of the sprocket wheel to the front end of the sliding surface so that said operative stretch of each chain can transmit both pulling and pushing forces for manoeuvring the objects respectively to and from the conveying position, while the inoperative chain stretch runs in a guide extending from the lower part of the sprocket wheel, and carrier elements which are attached to the ends of the operative chain stretches project up from said grooves, above the sliding surface, and transmit the maneuvering force from the ends of the operative chain stretches.

Compared with the previously known designs an assembly having the features mentioned here is considerably simpler and less expensive. By virtue of the fact that the chains are designed to effect displacement through the entire distance that an object is to be pulled or pushed during its loading onto the truck or unloading from the same, respectively, the assembly is able to effect every such displacement without any interruption, which speeds up the handling and facilitates the work for the truck operator. An essential design simplification compared with the know technology is also achieved by the fact that the operative chain stretches can transmit both pulling and pushing force.

BRIEF DESCRIPTION OF THE DRAWINGS

The invention will be explained in greater detail hereinafter with reference to the attached drawing in which:

FIG. 1 is a perspective view illustrating the assembly according to the invention in use at a press.

FIG. 2 shows, again in perspective, the assembly according to the invention, of which smaller parts are cut away.

FIGS. 5 and 6 are cross-sections along the lines V—V and VI—VI respectively in FIG. 4.

BACKGROUND OF THE PREFERRED EMBODIMENT

Figure 3:
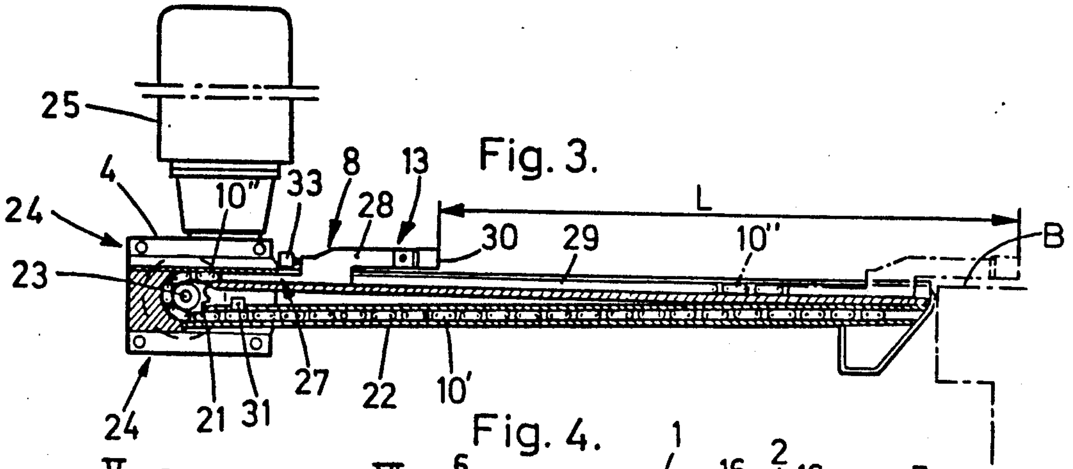
FIG. 3 is a longitudinal section of the assembly along the line III—III in FIG. 4, which is a plan view.
Figure 4:
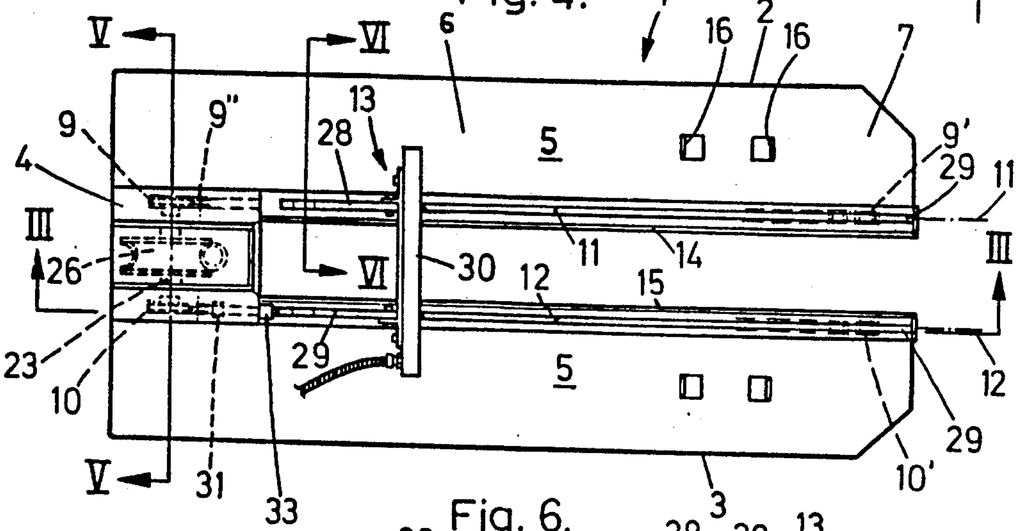

As assembly according to the invention each be used in many different types of industries where movement of heavy and large objects, such as tools, castings or other work-pieces commonly takes place, and where a forklift truck is used for such movements. In a typical case, as is illustrated in FIG. 1, it may be a question, in an engineering workshop or other idustrial plant, of moving a press tool A to or from a support B which, in the use example shown, is a press table of an eccentric press C.

By means of a forklift truck D, partially shown in the figure, the tool A is thus conveyed, carried by the fork E of the truck, between the press and another support which can be a storage shelf or a loading bench.

As is known, the forklift truck D, when used for conveying of this type, has an accessory 1 of a type that is generally known, comprising a unit which can be placed on the fork tines E of the truck when the latter is to be used for moving press tools or other heavy objects but which, during the time when such movements do not take place, can be kept separate from the truck so that the latter can be used for other conveying work arising in the plant.

The assembly 1 is built on a substantially plate-shaped frame of sheet-metal forming two leg parts 2, 3 which project from a motor part 4 and which extend parallel to each other in the same relative position as the fork tines E. When the assembly is in use, the leg parts thus come to rest on the fork tines, as is best seen from FIG. 6, and the leg parts together define a platform, the top surface portions of which constitute a sliding surface 5 on which the tool A is to be carried. The sliding surface extends in the longitudinal direction of the tines from the motor part 4, where the sliding surface has its rear end 6, along the entire length of the forks, so that the front end 7 of the sliding surface is at or slightly in front of the front edge F or the tines.

The said end 6 of the sliding surface normally corresponds to the position which the truck driver wishes the tool A to assume while he is driving the latter from or to the press table B, and, in order to be able to move the object along the sliding surface 5, in towards the conveying position or outwards from the latter, the assembly has, as is known, an operating mechanism of a generally known type which is generally designated by 8 in the drawing.

The operating mechanism operates electromechanically and according to the invention comprises a pair of drive elements 9, 10 which are longitudinally displaceable in the assembly and which preferably consist of roller chains, for example of the type used in bicycles.

The drive elements 9, 10 run in parallel tracks 11 and 12 respectively, preferably located on the inside of the leg parts 2 and 3 respectively, i.e. in the space between the fork tines E, and the tracks extend below and along the sliding surface 5 from its outer or front end 7 to the inner or rear end 6. In this case the drive elements are to be designed so that they can be longitudinally displaced in the tracks through the same distance as the tool A is displaced when it is to be transferred from its operative position on the press table B to its conveying position at the rear of the sliding surface 5, or when it is to be pushed in the opposite direction and delivered onto the press table or a storage shelf.

The operating mechanism 8 moreover comprises carrier elements 13 which are attached to the drive elements 9, 10 and follow these in longitudinal movement along the entire length designated by L in FIG. 3. The carrier elements project up from the drive elements above the sliding surface 5 so that they can act on the inward side of the tool A and transmit to it the horizontal force which is required for its displacement.

In the illustrated embodiment of the invention each leg part 2, 3, is made integral with a U-shaped rail 14, 15. The rails, which define the tracks in which the drive elements 9, 10 are operative, are shown here to follow the inner side of the respective fork tines E when the assembly is in place on the truck. Depending on the relative distance between the tines and the width of the objects which are to be conveyed, the rails can have another position, such as on the outside or alternatively top side of the tines. In the case of such greater lateral spacing, it may be advantageous to arrange a third drive element operating in the centre of the assembly between the two tines.

Figure 6:
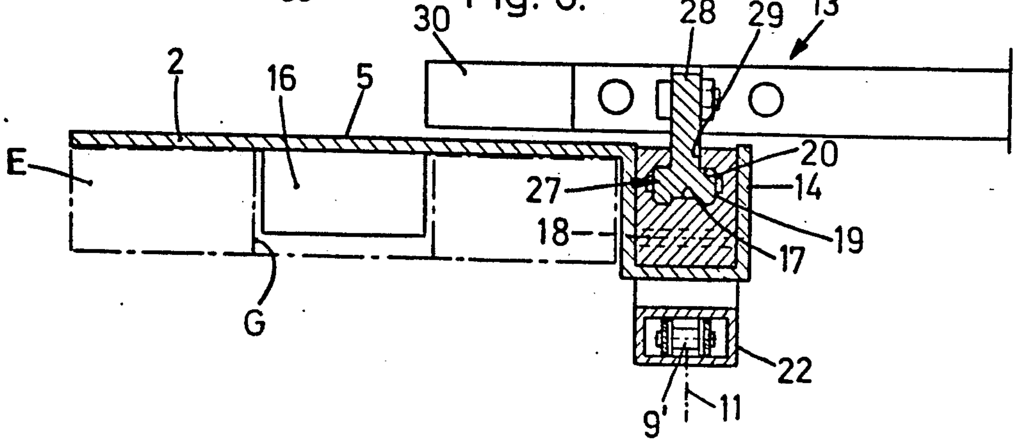

As can best be seen from FIGS. 2 and 6, the leg parts 2, 3 have projections 16 which are directed downwards and are made by punching and bending a square piece of the sheet-metal material. The projections are intended to fit into the recesses G which are standard for forklift trucks, and the projections thus provide, together with the rails 14, 15, a defined working position for the assembly when it is set down from above onto the tines, and without other holding means being required.

Incorporated in the rails 14, 15 are profiles which form continuous longitudinal grooves 17 for the drive elements or chains 9, 10. The profiles can be made up of three parts held together in the rails or, as shown in FIG. 6, can be designed in a single piece fixed with screws 18. The material of the profiles is expediently Teflon or some other material which provides low friction with respect to the drive elements and has good wear resistance. As appears from the figure, each profile forms a pair of opposite groove walls 19 and 20 which, in the transverse direction and vertical direction, respectively, surround and guide a drive element 9, 10 inserted in the groove 17. The drive element is thus confined by the groove to linear displacement, even when it is subjected to a pressure load in the longitudinal direction. According to a primary characteristic feature of the invention the drive element can therefore consist of a roller chain stretch which operates in an unclosed track.

In this embodiment of the operating mechanism each drive element thus requires only one sprocket wheel 21 forming the center point of the unclosed track which, by means of the above described straight groove 17, extends tangentially to the upper part of the sprocket wheel. On the opposite side there extends, likewise tangentially to the sprocket wheel 21, a rectangular tube 22 of sheet-metal which extends along beneath the U-shaped rail 14, 15 parallel to the latter or in a slightly converging direction relative thereto and ends under the sliding surface 7 where the unclosed track 11, 12 has its two end points. The tube 22 forms a guide in which the lower chain stretch 9', which does not transmit any force, can run freely back and forth.

The two sprocket wheels 21 are attached to a transverse drive shaft 23 which is the output shaft of a gear transmission 24 that is driven by an electric motor 25. The transmission can expediently consist of a worm screw on the motor shaft, arranged vertically and in front of a worm wheel 26 on the drive shaft 23, by which means the motor acquires a central position at the rear of the assembly with good clearance relative to the framework H of the forklift truck.

The upper chain stretch 9″ which is force-guided by the groove 17 has its outermost link, which in the conveying position is located immediately in front of the sprocket wheel 21, connected to a slider 27 incorporated in the carrier elements 13. The slider, which is shown in section in FIG. 6, has a cross-section which, like the chain links, fits between the four groove walls 19 and 20 and is, as appears from FIG. 3, considerably longer than the height of the groove 17, whereby the slider is guided satisfactorily in the latter. Projecting upward and forward from the slider, is a plate-shaped part 28 which is preferably made integral with the slider and is considerably narrower than the latter so that it fits into the longitudinal slot 29 which opens vertically at the top of the groove 17 and is located immediately below and parallel to the sliding surface 5.

Above the sliding surface the plate-shaped parts 28 of the carrier elements are extended forwards so that two similarly positioned and freely projecting bars are formed. The ends of these are bridgingly connected by means of a rod-shaped electromagnet 30 which extends at right angles to the grooves 17 and the chain stretches 9″, 10″ across at least the central part of the sliding surface 5. The length of the said bars is such that, when the drive and carrier elements have been displaced the length L and assume the fully forward position shown by dot-and-dash lines in FIG. 3, they reach out past the front edge of the sliding surface 5 and onto the press table B to a sufficient extent for the press tool A, with the magnetic rod 30 as an abutment means, to reach the intended position on the press C.

When this end position of the operating mechanism is assumed and the tool has, by means of the pushing force from the operative chain stretches 9″ and 10″, been moved forwards along the sliding surface 5, the current to the motor 25 is switched off or changed to an inverted phase sequence under the action of an end position breaker 31. The latter can be situated immediately in front of one of the sprocket wheels 21, which position the outer end of the idle stretches 9′ and 10′ of the chains has now reached, and in such a case the end position breaker can suitably be connected in such a way that it reacts when it is passed by the last link of one of the idle chain stretches, on the drawing the part 10′. In this way the operating mechanism is stopped or, upon inversion of the phases, returns to the conveying position.

When the press tool A is to be removed from the press, the operator connects the electromagnet 30, by means of one of the buttons on the switch 32, to the forklift truck power supply system, whereafter with the fork E at the correct level relative to the press table B, he drives forwards to the press at the same time as he presses another of the buttons on the switch, which supplies current to the motor 25, so that the operating mechanism is allowed to push the carrier to the fully forward position.

Upon contact between the rod magnet 30 and the press tool A, which is assumed to be of magnetic material, the operator can, by starting up the motor 25 and the drive elements 9, 10 in the opposite direction, pull the tool, without manual intervention, from the press table and thereafter move it rearward along the sliding surface 5 towards the conveying position. When this position is reached, a second end position breaker 33 comes into operation. This breaker can be situated in the movement track of a part of the carrier elements 13, for example one of the plate-shaped parts 28, whose rearward edge strikes the breaker 33 and stops the movement of the drive and manoeuvring elements and thus of the tool A.

In an alternative embodiment (not shown on the drawing) the carrier means has no electromagnet. Instead the plate-shaped part 18 of each carrier element is provided with a gripping means which is directed outwardly and can be a hook or a similar mechanical element. Each of the gripping means is arranged to interlock with, respectively be released from, a lug or the like on the tool or the object which is to moved.

It is evident that the length of the carrier elements 13, regardless of their design, shall be such that the tool or the object A can be pushed out to a sufficient extent past the front edge of the tines F and of the sliding surface 5 to reach the correct position in question, and can be pulled from said position to a conveying position on the sliding surface of the assembly.

From the foregoing it can be seen that an assembly according to the invention, comprising an operating mechanism which has the characteristic features described above and defined by the claims, provides a simple, inexpensive and efficiant apparatus for moving heavy objects from one to another of a number of supporting positions in industrial premises.

I claim:

1. An accessory adapted to be readily removably mounted on the forwardly projecting tines of a forklift truck, by means of which heavy articles can be slid off of and onto supporting surfaces and on which such articles can be transported from one to another of such surfaces, said accessory comprising:

A. structure providing a platform having
  (1) a front end,
  (2) a rear end,
  (3) laterally opposite sides, and
  (4) top surface portions which lie in a substantially horizontal plane and upon which a heavy article can be slidably supported;

B. a laterally extending shaft confined to rotation near the rear end of said platform and below and parallel to said plane;

C. a pair of axially spaced sprockets on said shaft, constrained to rotation with it, each said sprocket being oriented to have a top and a bottom;

D. two track pairs on said structure, one track pair for each of said sprockets,
  (1) each said track pair comprising
    (a) an elongated upper track having a rear end forwardly adjacent to the top of its sprocket and a front end near the front end of said platform, and
    (b) an elongated lower track which is spaced downwardly from the upper track, has a rear end forwardly adjacent to the bottom of its sprocket, and has a front end between its sprocket and the front end of said platform, and
  (2) each said track being of substantially U-shaped cross-section and defining an upwardly opening groove;

E. a pair of drive chains, one for each of said sprockets, each said drive chain having
  (1) a medial portion trained around the rear of its sprocket to be driven lengthwise by rotation of the sprocket,
  (2) an upper stretch which has a front end and which is received with a close slidable fit in the upper track for its sprocket to be confined to linear motion by that track, and (3) a lower stretch which has a front end and which is similarly received in the lower track for its sprocket;

F. a pair of sliders, one for each drive chain, each said slider having (1) a lower portion (a) which is confined in the upper track for the drive chain, to be constrained by that track to motion lengthwise along it, and (b) which has a connection with the front end of the upper stretch of its drive chain, to be moved along said track by rotation of the sprocket for its chain, and (2) an upper portion which is above said plane;

G. article engaging means secured to the upper portions of said sliders, at front ends thereof, and bridging across them, whereby an article can be slid off of said top surface of the platform; and H. drive means on said structure for driving said shaft in each direction of its rotation.

2. The accessory of claim 1, further characterized in that said drive means comprises:

(1) a worm wheel fixed on said laterally extending shaft, between said sprockets, (2) a motor mounted on said platform, near the rear end thereof, most of said motor being above said plane, and said motor having a vertical motor shaft which projects below said plane, and (3) a worm gear on the shaft of said motor, drivingly engaging said worm wheel.

3. The accessory of claim 1, wherein the lower portion of each said slider has front and rear ends, said accessory being further characterized in that:

(1) the connection between the lower portion of each said slider and the upper stretch of its drive chain is at said rear end of said lower portion, and (2) the upper portion of each said slider has a front end which is a substantial distance forward of said front end of the lower portion and to which said article engaging means is secured.

4. The accessory of claim 1, further characterized by: said structure that provides a platform further having (1) means on a bottom portion thereof defining a pair of channels, one extending fore-and-aft along each of said laterally opposite sides, each adapted to receive a tine of a forklift truck by which the accessory can be supported, and (2) means defining a downwardly projecting protuberance on each such channel, receivable with a substantially close fit in a hole in a forklift truck tine to confine the accessory against substantially horizontal displacement relative to said tines.

5. An accessory adapted to be readily removably mounted on the forwardly projecting tines of a forklift truck, by means of which heavy articles can be slid off of and onto supporting surfaces and on which such articles can be transported from one to another of such surfaces, said accessory comprising:

A. structure that provides a platform having (1) a front end, (2) a rear end, (3) laterally opposite sides, and (4) top surface portions which lie in a substantially horizontal plane and upon which a heavy article can be slidably supported; and (5) bottom portions defining a pair of fore-and-aft extending laterally spaced apart channels, in each of which a tine of a forklift truck is receivable for supporting the accessory;

B. a laterally extending shaft confined to rotation near the rear end of said platform and below and parallel to said plane;

C. a pair of axially spaced sprockets on said shaft, constrained to rotation with it, each oriented to have a top and a bottom;

D. two track pairs on said structure, one track pair for each of said sprockets, (1) each said track pair comprising (a) an elongated upper track having a rear end forwardly adjacent to the top of its sprocket and a front end near the front end of said platform, and (b) an elongated lower track which is spaced downwardly from the upper track, has a rear end forwardly adjacent to the bottom of its sprocket, and has a front end between its sprocket and the front end of said platform, and (2) each said track being of substantially U-shaped cross-section and defining an upwardly opening groove;

E. a pair of drive chains, one for each of said sprockets, each said drive chain having (1) a medial portion trained around the rear of its sprocket to be driven lengthwise by rotation of the sprocket, (2) an upper stretch which has a front end and which is received with a close slidable fit in the upper track for its sprocket to be confined to linear motion by that track, and (3) a lower stretch which has a front end and which is similarly received in the lower track for its sprocket;

F. a pair of sliders, one for each drive chain, each said slider having (1) a lower portion which has front and rear ends, said lower portion (a) being confined in the upper track for the drive chain, to be constrained by that track to motion lengthwise along it, and (b) having at its rear end a connection with the front end of the upper stretch of its drive chain, to be moved along said track by rotation of the sprocket for its chain, and (2) an upper portion which is above said plane and which has a front end that is a substantial distance forward of the front end of the lower portion;

G. article engaging means secured to said front ends of the upper portions of said sliders and bridging across them, whereby an article can be slid off of said top surface of the platform and a distance forwardly beyond the front end of the platform;

H. drive means on said structure for driving said shaft in each direction of its rotation; and I. means defining a downwardly projecting protuberance on each said channel, receivable with a substantially close fit in a hole in a forklift truck tine to confine the accessory against forward and rearward displacement relative to forklift truck tines on which it is supported.

* * * * *